United States Patent
Green et al.

(10) Patent No.: US 11,576,039 B2
(45) Date of Patent: Feb. 7, 2023

(54) AUTHENTICATION OF A 3G CELLULAR DEVICE OVER 4G MOBILE NETWORK

(71) Applicants: AT&T Mobility II LLC, Atlanta, GA (US); AT&T Intellectual Property I, L.P., Atlanta, GA (US)

(72) Inventors: Eric W. Green, Suwanee, GA (US); Maurice Scott Laster, Alpharetta, GA (US); Inderpreet Ahluwalia, Austin, TX (US); Christopher McConnell, Reno, NV (US); Timothy Shira, Queen Creek, AZ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 658 days.

(21) Appl. No.: 16/568,995

(22) Filed: Sep. 12, 2019

(65) Prior Publication Data
US 2021/0084491 A1   Mar. 18, 2021

(51) Int. Cl.
| H04W 12/06 | (2021.01) |
| H04W 8/20 | (2009.01) |
| H04W 88/16 | (2009.01) |
| H04W 84/04 | (2009.01) |

(52) U.S. Cl.
CPC ............. *H04W 12/06* (2013.01); *H04W 8/20* (2013.01); *H04W 84/045* (2013.01); *H04W 88/16* (2013.01)

(58) Field of Classification Search
CPC ..... H04W 88/16; H04W 84/045; H04W 8/20; H04W 12/06

USPC ............................................................. 726/7
See application file for complete search history.

(56) References Cited

U.S. PATENT DOCUMENTS

| 8,965,362 | B1* | 2/2015 | Thodupunoori | H04W 48/08 370/335 |
| 10,332,386 | B1* | 6/2019 | Trundle | G08B 29/02 |
| 2011/0262129 | A1* | 10/2011 | Shaffer | H04W 12/06 398/5 |
| 2013/0336119 | A1* | 12/2013 | Billonneau | H04W 76/12 370/235 |

(Continued)

OTHER PUBLICATIONS

"3rd Generation Partnership Project; Technical Specification Group Services and System Aspects; Architecture aspects of Home NodeB and Home eNodeB (Release 9)." 3GPP; 3GPP TR 23.830 V9.0.0 (Sep. 2009); 55 pages.

(Continued)

*Primary Examiner* — Josnel Jeudy
(74) *Attorney, Agent, or Firm* — Amin, Turocy & Watson, LLP

(57) ABSTRACT

A customer premises node device can receive an authentication message from a fixed cellular communication device that operates according to a third-generation mobile network access standard (e.g., a 3G alarm panel). The customer premises node device can facilitate transmitting the authentication message, to a network node that operates according to a fourth-generation mobile network access standard. The authentication message can then be routed via mobile network components, including a network gateway device, to a home location registry device, which can authenticate the 3G fixed cellular communication device for communications on a 4G mobile network.

20 Claims, 10 Drawing Sheets

(56) References Cited

U.S. PATENT DOCUMENTS

| | | | | |
|---|---|---|---|---|
| 2014/0073288 A1* | 3/2014 | Velasco | ............... | H04W 12/06 455/411 |
| 2014/0153555 A1* | 6/2014 | Gupta | .................. | H04L 63/205 370/338 |
| 2014/0153722 A1* | 6/2014 | Mizikovsky | .......... | H04W 12/06 380/270 |
| 2014/0349611 A1* | 11/2014 | Kant | .................... | H04W 12/06 455/411 |
| 2016/0270054 A1* | 9/2016 | Kim | ..................... | H04W 76/10 |
| 2017/0055153 A1* | 2/2017 | Fransen | ................ | H04W 48/08 |
| 2018/0035351 A1* | 2/2018 | Kodaypak | ............ | H04W 76/10 |
| 2018/0308475 A1* | 10/2018 | Locke | ................... | G06F 40/279 |
| 2018/0332524 A1* | 11/2018 | Rasanen | .............. | H04W 28/24 |
| 2019/0261179 A1* | 8/2019 | Hu | ..................... | H04W 36/0038 |
| 2019/0349024 A1* | 11/2019 | Wang | ................... | H04B 1/7143 |

OTHER PUBLICATIONS

"3rd Generation Partnership Project; Technical Specification Group Radio Access Network; Mobility procedures for Home Node B (HNB); Overall description; Stage 2 (Release 15)." 3GPP; 3GPP TS 25.367 V15.0.0 (Jun. 2018); 14 pages.

* cited by examiner

AUTHENTICATION OF A 3G CELLULAR DEVICE OVER 4G MOBILE NETWORK

TECHNICAL FIELD

The present application relates generally to the field of wireless communication and, more specifically, to authentication of a third-generation cellular device, which can comprise an alarm panel.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, to Fourth Generation (4G) in 2010s (including Long Term Evolution (LTE) and variants of LTE). Additionally, fifth generation (5G) access networks, which can also be referred to as New Radio (NR) access networks are being implemented.

With continued developments around 4G (e.g., LTE) networks and the advent of 5G networks, mobile networking infrastructure is expected to facilitate fulfillment of the demand for exponentially increasing data traffic, and to handle a very wide range of use cases and requirements, including among others, mobile broadband (MBB) services, enhanced mobile broadband (eMBB) services, "vehicle-to-everything" (V2X) communications, and machine type communications (such as Internet of Things (IOT) devices).

As wireless technologies continue to evolve and advance, older technology will eventually be phased out. As 3G is phased out, older devices, including but not limited to, fixed 3G cellular devices (like 3G residential alarm panels), there might be a desire to adapt many of these devices to communicate on a 4G (and beyond) network. For example, as of 2010, there were an estimated eighteen million home security systems installed in the United States, and most of the alarm panels that exist in a customer premises are embedded, for example, in a wall, and integrated with other related monitoring equipment throughout the customer premises (e.g., cameras, fire alarms, motion sensors, etc.), making it less practical (and less economical) to replace all of the existing 3G alarm panels.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
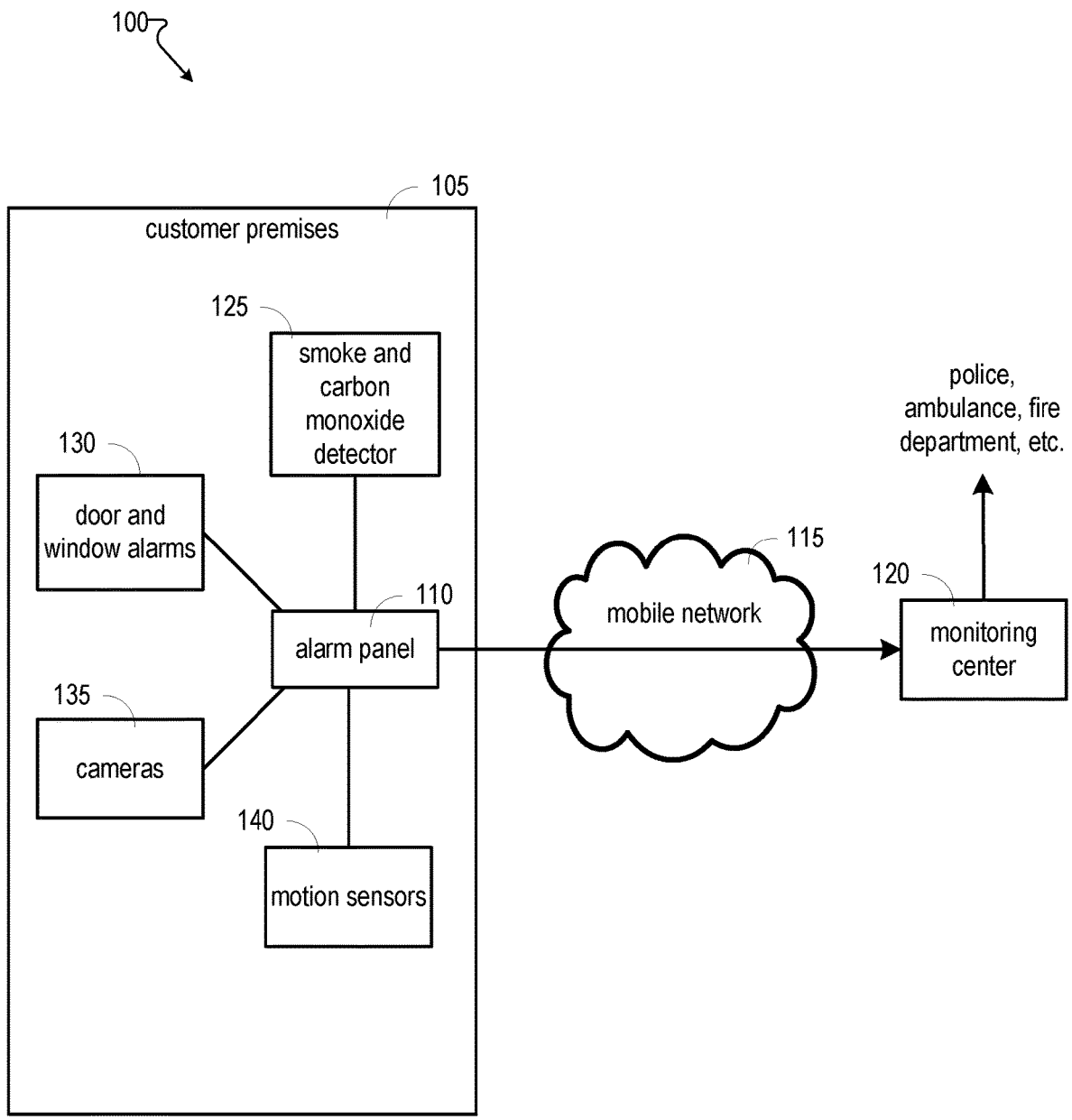
FIG. 1 illustrates an example customer premises alarm system, comprising an alarm panel operable to communicate via a mobile network.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., customer premises intermediate node device, 3G home NodeB gateway, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 9 and FIG. 10.

LTE technology has been a great success in the cellular connectivity world and has driven widespread adoption of smart phones that changed the way people communicate today. At some point, certain 3G infrastructure will be decommissioned or replaced (e.g., 3G NodeB network nodes). In example embodiments in accordance with the present application, 3G fixed cellular communication devices can be served by an LTE network infrastructure with network devices implementing functionality supporting 3G standard features and capabilities. There remain a significant number of 3G alarm panels embedded at customer premises, and this support for 3G functionality can facilitate maintenance of home security and monitoring services.

In example embodiments in accordance with the present application, systems and methods facilitate the authentication of 3G fixed cellular devices (e.g., 3G alarm panels). A customer premises intermediate node (CPIN) at the customer's premises can receive an authentication message (e.g., authentication request) from a 3G cellular communication device (e.g., 3G alarm panel), and can associate the authentication message with a data element identifying the authentication message as originating from a 3G cellular device. The CPE authentication device transmits the authentication message comprising the data element to a 3G Home NodeB gateway (3GHNB gateway), which functions as a radio network controller (RNC). This 3GHNB gateway network device can, based on the presence of the data element, facilitate routing of the authentication message to a home location registry (HLR), which can then authenticate the 3G fixed cellular device.

FIG. 1 shows an example of a typical environment 100 in which a premises security and monitoring system communicates via a wireless network with a monitoring center. At the customer premises 105, a typical premises security and monitoring system can comprise an alarm panel 110. Alarm panel 110 can comprise, for example, a keypad to enter numbers, buttons to set or cancel an alarm, a display, a speaker etc. Alarm panel 110 might typically be embedded in a wall nearby an entrance. The alarm panel 110 can also comprise a cellular communication module that enables the alarm panel 110 to communicate via a mobile network 115 with, for example, a monitoring center 120 (e.g., operated by a security company entity, such as ADT, Protection One, Alarm Force, etc.). Connected to the alarm panel 110 can be various other emergency and security related devices. Such devices can comprise one or more fumes detectors, such as a smoke and carbon monoxide detector 125, entrance alarms (such as door and window alarms 130), one or more cameras 135, one or more motion sensors 140, and various other devices related to monitoring, security or emergencies. Typically, one of these devices connected to the alarm panel 110 will detect a condition, which results in a signal being sent to the alarm panel 110. The alarm panel 110 then uses its cellular communication module to send a signal via the mobile network 115 to a monitoring center 120, which can comprise one or more devices that facilitate contacting an emergency responder (e.g., police, ambulance, fire department).

Figure 2:
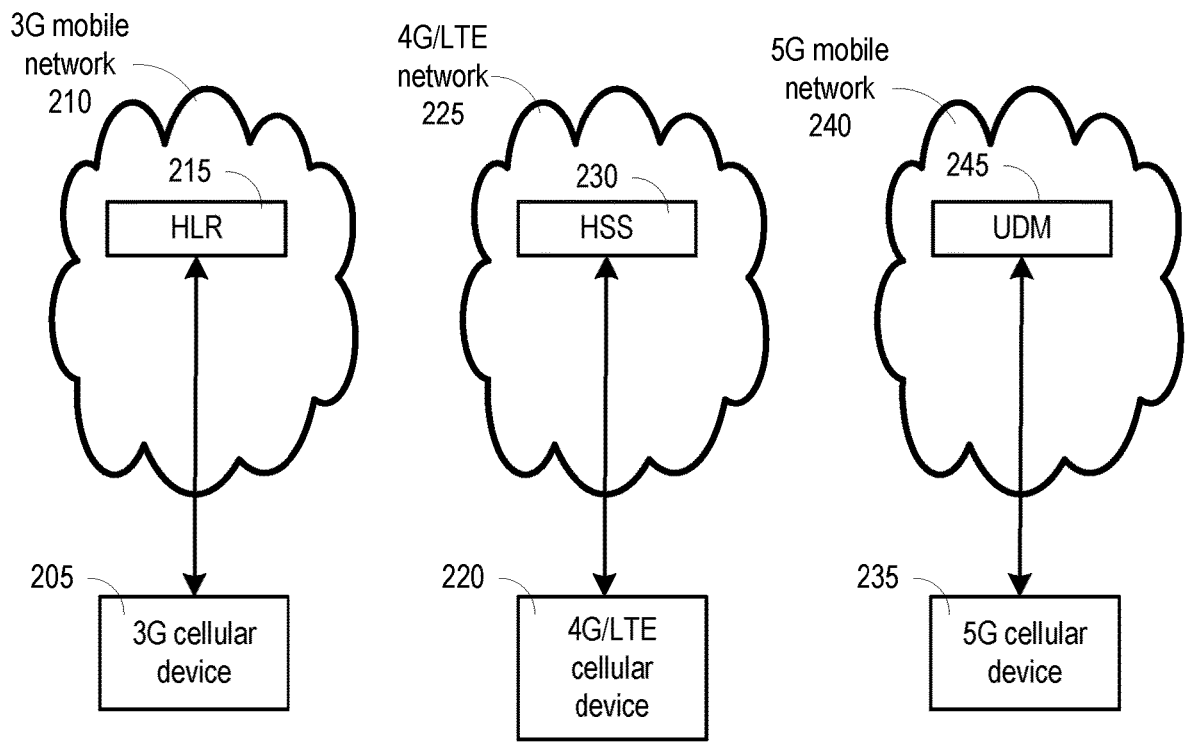
FIG. 2 illustrates a diagram depicting examples of a home location registry (HLR) that authenticates devices for communication on a 3G mobile network, a home subscriber system (HSS) that authenticates devices for communication on a 4G mobile network, and a universal data management (UDM) that authenticates devices for communication on a 5G mobile network.

Like typical cellular communications equipment, an alarm panel 110 having a cellular communications module undergoes an authentication process before being allowed to communicate via a mobile network. Referring to FIG. 2, a 3G cellular device 205, such as an alarm panel 110 that is a 3G alarm panel, can transmit a communication via a 3G mobile network 210 requesting authentication. An example of a typical authentication process involves the subscriber identity module (SIM) card stored in the cellular communications module of the alarm panel 110. The SIM contains keys used to authenticate subscribers on a mobile communication network. An authentication key is used to authentication the SIM card on the mobile network. Each SIM has a unique authentication key assigned by the operator. The authentication key is also stored in a database of the carrier's network (e.g., 3G mobile network 210). For example, the authentication key can be stored in a home location registry (e.g., HLR 215). When the cellular communication device first activates using the SIM card, it obtains (e.g., retrieves) the International Mobile Subscriber Identity (IMSI) from the SIM card and transmits it to the mobile operator for authentication. The HLR 215, upon receiving the authentication message, then searches the incoming authentication message (e.g., authentication request) for the IMSI and the associated authentication key. The HLR 215 then generates a random number or RAND and signs it with the IMSI, and then provides another number called Signed Response 1 (SRES_1). The RAND will be sending this information to the cellular communication device, which then, using the SIM, signs it with the authentication key and produces the SRES_2, which is then passed into the operator network. The mobile network then compares the SRES_1 it produced and the SRES_2 from the mobile phone. If both match, the SIM is authenticated. By making this match, a subscriber can be logged on to the network and he or she can now make use of the services of the mobile service provider with his or her cellular communication device.

Still referring to FIG. 2, in a 4G/LTE network, and also in a 5G network, 4G and 5G devices can also be authenticated. In the case of a 4G/LTE network, a 4G/LTE cellular communication device 220 can be authenticated via a 4G/LTE mobile network 225 using the Home Subscriber Server (HSS) 230, which functions similarly to the HLR 215. In 5G, the unified data management (UDM) 245, which has functionality similar to the HSS 230, facilitates the authentication of a 5G cellular device 235 for communications on a 5G network 240.

Figure 3:
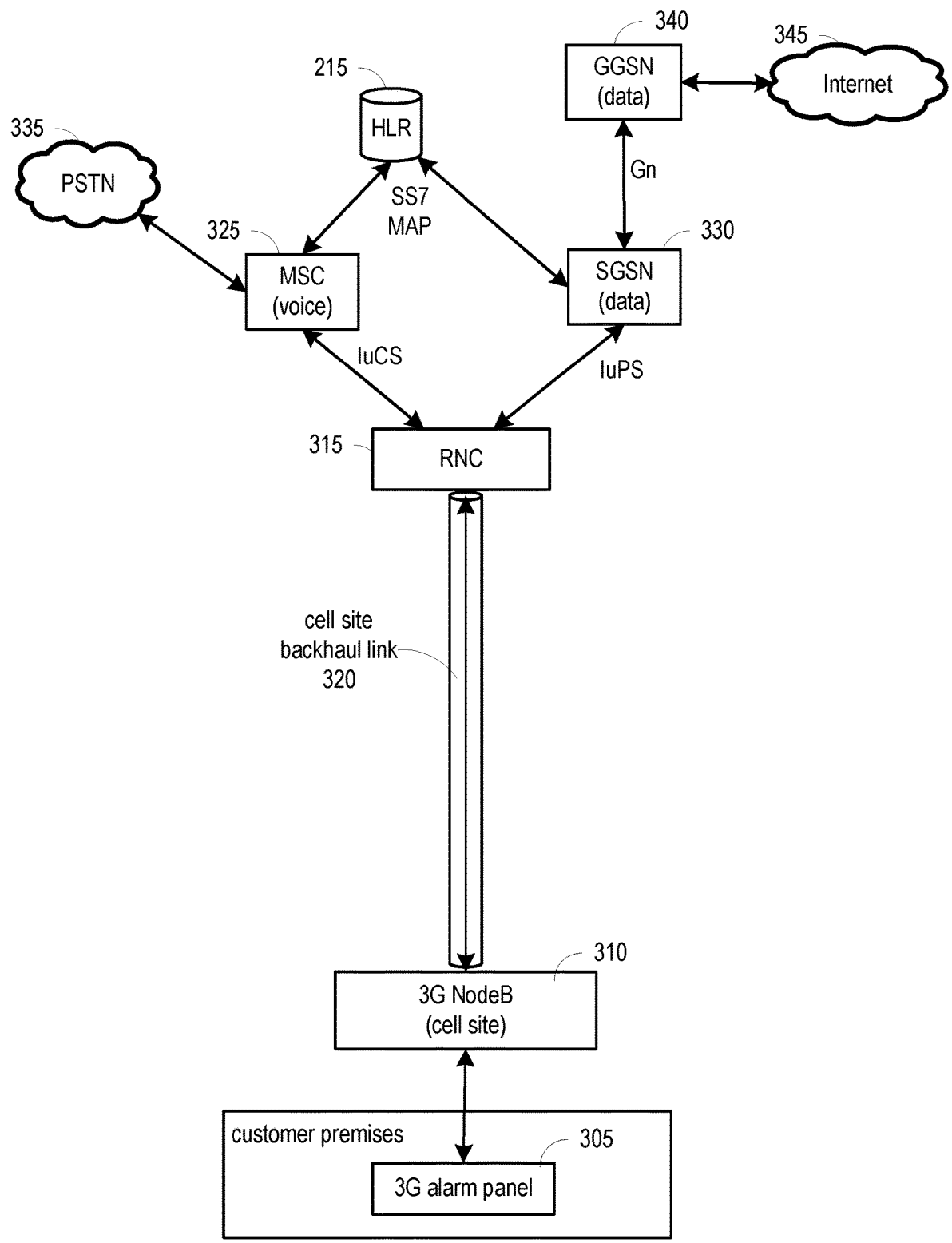
FIG. 3 illustrates an example of typical components involved in an authentication of a fixed cellular device that operates according to a third generation mobile network access standard (3G fixed cellular device).

FIG. 3 illustrates a diagram of some example components of a 3G mobile network 210, through which 3G cellular device 205 comprising a 3G alarm panel 305, communicates. The 3G alarm panel 305, to be authenticated, transmits its authentication message (e.g., authentication request) to a 3G network node, e.g., 3G NodeB 310. A network node, such as a 3G NodeB, can comprise one or more transceivers, and serves a cell of a mobile network, providing cellular coverage in that cell that can be used for the transmission of voice, data, and other content.

The authentication message can be routed by the 3G NodeB 310 to a radio network controller (e.g., shown as RNC 315 in FIG. 3), which facilitates radio resource management and some mobility management functions. The authentication message can be routed to the RNC 315, for example, via a cell site backhaul communication link 320. In a typical arrangement in a 3G mobile network, the RNC 315 can be situated between the 3G NodeB 310 and elements of the mobile core network (CN). These elements can include, for example, a mobile switching center (MSC), shown as MSC 325 in FIG. 3, and a serving General Packet Radio Service (GPRS) support node (SGSN), shown as SGSN 330 in FIG. 3. The RNC 315 can be connected to the MSC 325 via an IuCS connection, and to the SGSN 330 via an IuPS connection. The MSC 325 is responsible for switching voice calls to mobile units, as well as to the local telephone system (e.g., public service telephone network (PSTN), PSTN 335)

while the SGSN 330 handles all packet switched data within the network. The SGSN 330 relays the data between the SGSN and a gateway GPRS support node (GGSN), e.g., GGSN 340. The GGSN controls the internetworking between the GPRS network and external packet switched networks, such as the Internet 345. The SGSN 330 can be connected to the GGSN 340 via a Gn connection.

Still referring to FIG. 3, and back to authentication, an authentication message from 3G Node B 310 can be routed to the RNC 315. The RNC 315 can route the authentication message to the MSC 325, or the SGSN 330. Both the MSC 325 and the SGSN can route information, including the authentication message, to the HLR 215. The HLR 215, as mentioned above with respect to FIG. 2, can authenticate the 3G alarm panel 305 for communications on the 3G mobile network 210.

Figure 4:
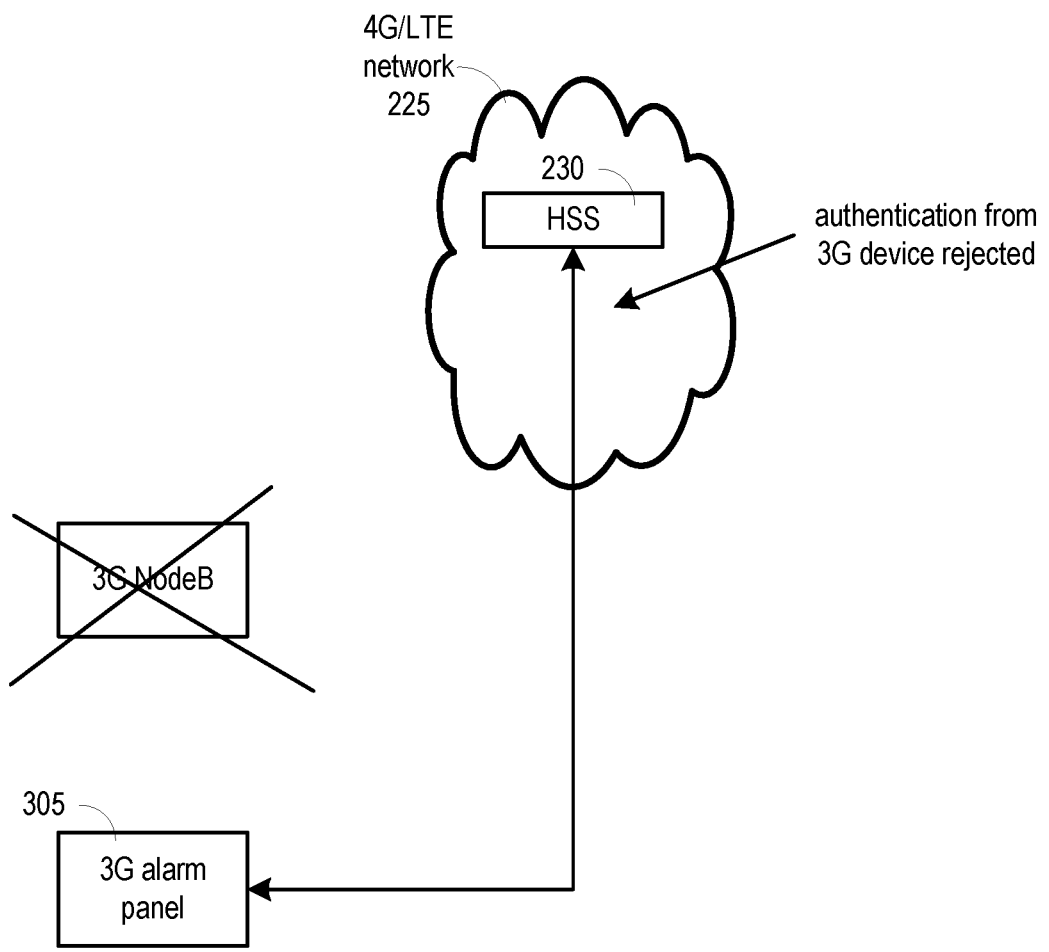
FIG. 4 illustrates an example depicting the inability of a 3G alarm panel to authenticate via an HSS of a 4G mobile network.

Moving on to FIG. 4, if 3G NodeB cell sites are decommissioned as part of a "3G sunset," this can present a situation in which many 3G devices, including but not limited to 3G alarm panels (e.g., 3G alarm panel 305), will be unable to obtain authentication to operate on a 4G network. Referring to FIG. 4, if a device were to be configured to accept an authentication message from the 3G alarm panel 305, the authentication message would be routed to an HSS (e.g., HSS 230), which as mentioned above with respect to FIG. 2, contain the data store for 4G device credentials, and authenticates devices to communicate via a 4G mobile network. The HSS 230, receiving authentication request from a 3G device (e.g., 3G alarm panel 305), would not be able to authenticate the request, as the proper credentials for the 3G device would be stored in the HLR (e.g., HLR 215) for a 3G mobile network.

While a 3G "sunset" might decommission 3G NodeB cellsites (e.g., eliminate 3G NodeB network nodes, for example 3G NodeB 310), because 3G outbound roaming might be supported for several years beyond a 3G sunset, the HLR, GGSN, and MSC network functions will remain operational as software functions on other platforms (HSS/virtual HSS (vHSS), packet gateway (PGW)/virtual packet gateway (vPGW), and virtual media gateway control function (vMGCF), respectively). The SGSN network function is currently a software function on the serving gateway (SGW)/virtual serving gateway (vSGW) platform. In example embodiments of the present application, the SGSN network function would remain operational beyond the 3G sunset.

In example embodiments of the present application, a 3G fixed cellular device (e.g., 3G alarm panel 305) uses the authentication keys stored on the SIM card of the 3G fixed cellular device, to authenticate with the HLR (e.g., HLR 215). A customer premises intermediate node (CPIN), in accordance with example embodiments of the present application, is programmed and operable to receive an authentication message (a.k.a. authentication request) from a 3G fixed cellular device (e.g., 3G alarm panel 305), and route the authentication message via components and functions of a 4G mobile network, to a network device, referred to herein as the 3G Home NodeB gateway (3GHNB gateway), that acts as a RNC. Thus, the CPIN can pass through the authentication messaging in the same manner that a 3G NodeB would. This would allow for secure 3G SIM authentication without storing the network keys locally on any end device.

The 3GHNB gateway, in accordance with example embodiments of the present application, can be a network gateway device that can be programmed to enable it to receive the authentication message, inspect it, and direct the authentication message to the HLR for authentication of the 3G fixed cellular device. Once authenticated, the 3G fixed cellular device can operate on the 4G mobile network (e.g., 4G/LTE mobile network 225). This method would allow for a customer to effectively be able to use the 3G cellular device post 3G sunset.

Figure 5:
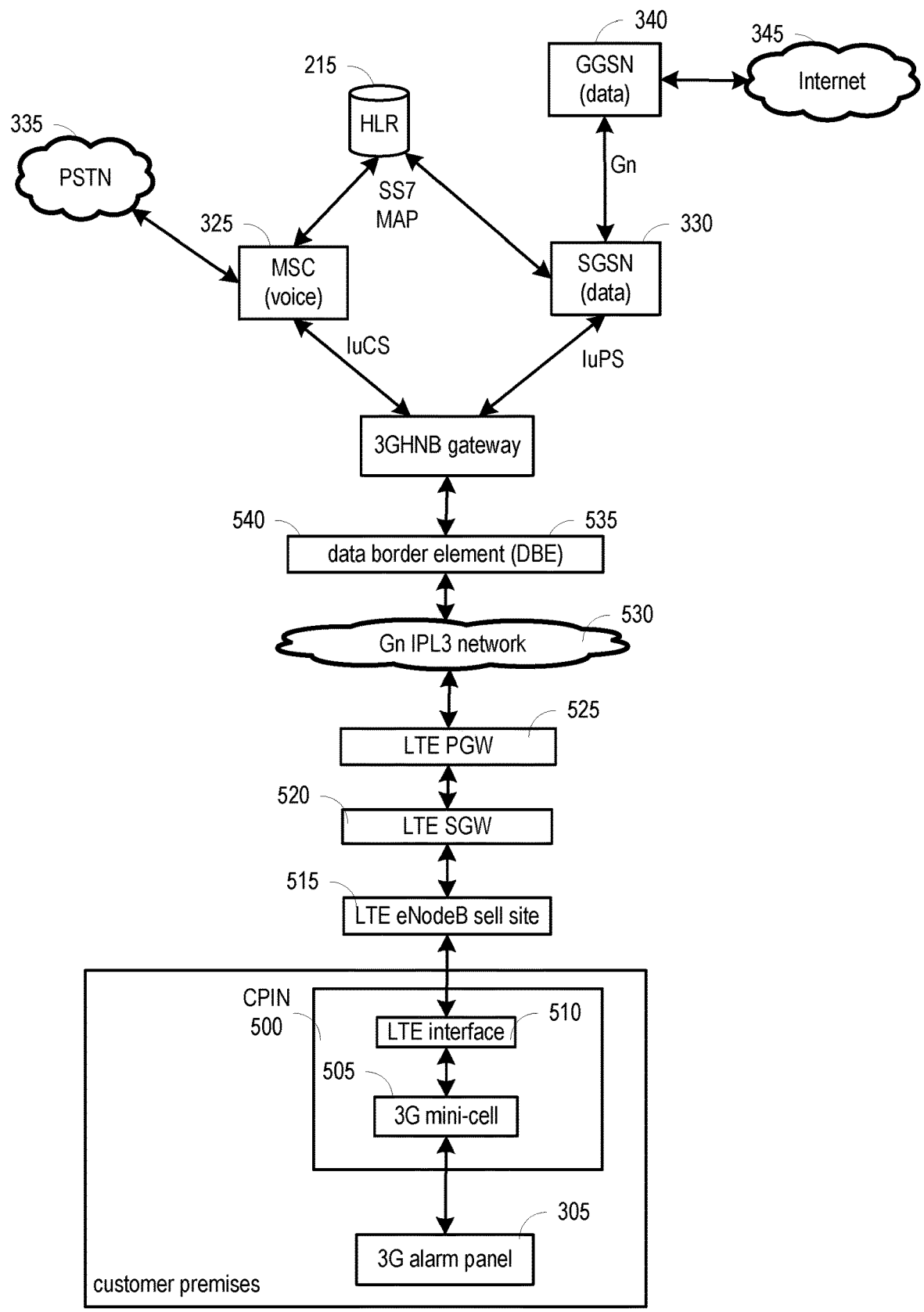
FIG. 5 illustrates a block diagram depicting components related to the authentication of a 3G fixed cellular device using a customer premises intermediate node (CPIN) device and a 3G home NodeB gateway network device, in accordance with various aspects and example embodiments of the subject application.

As shown in FIG. 5, in example embodiments in accordance with the present application, systems and methods facilitate the authentication of a 3G fixed cellular device (e.g., 3G alarm panel 305). The CPIN (e.g., CPIN 500) at the user's home can be operable to receive an authentication message from the 3G cellular communication device. In example embodiments, the authentication message is received via a wireless connection to the CPIN. The CPIN 500 can implement a 3G mini-cell component 505 (e.g., this can be a software module implemented by the processor of the CPIN 500). The 3G mini-cell component 505 can operate similarly to a 3G femtocell gateway, as defined by the 3GPP standards. As such, the 3G fixed cellular device can communicate with the CPIN 500 as if it were communicating with a femtocell gateway device. In example embodiments, an Access Point Name (APN) can also be used to facilitate a communication tunnel from the 3G fixed cellular device to the CPIN 500. Using an APN to communicate with the CPIN 500 can obviate the need to use a security protocol, such as the IPSec protocol.

In example embodiments, a wired connection (e.g., co-axial, Ethernet, universal serial bus, etc.) connection can also (or alternatively) be used to connect the 3G fixed cellular device (e.g., alarm panel 305) to the CPIN 500, which can be mounted nearby the 3G fixed cellular device.

Still referring to FIG. 5, the 3G mini-cell component 505 of the CPIN 500 can interface with an LTE interface component 510. The LTE interface component 501, in example embodiments, can be operable to function as an LTE mobile hotspot router, allowing it to receive transmissions from the 3G mini-cell component 505. As such, the LTE interface component 510 translates the 3G message received from the 3G fixed cellular device (e.g., an authentication message) into a 4G format that can be then be transmitted according to 4G protocols to the LTE network node (e.g., LTE eNodeB 515) at a cell site. In example embodiments, the CPIN 500 can associate the authentication message with a data element identifying the authentication message as originating from a 3G device. This can be implemented, for example, using an APN, which allows the authentication message to be tunneled through the 4G network and through the 3G functionality all the way to the HLR. To facilitate transmissions to the LTE network node, the CPIN 500 can comprise one or more transceivers.

Of note, to itself be able to communicate via the 4G mobile network, the CPIN 500 also functions as an LTE end device (e.g., user equipment, or UE), in that it can use the authentication keys stored on the CPIN's SIM card to authenticate itself to the HSS (e.g., HSS 230). This LTE attach process is independent of the 3G alarm panel's 3G attach process (with the exception that the CPIN must be attached to the LTE network in order to provide the connectivity path for the 3G alarm panel to attach to the 3G core network).

Still referring to FIG. 5, after the authentication message originating from the 3G fixed cellular device is transmitted to the LTE eNodeB 515, the authentication message can be routed through other components of a 4G/LTE network, including an LTE serving gateway (SGW) (e.g., SGW 520), and an LTE packet data network gateway (PGW) (e.g., PGW 525). The authentication message can be routed through a Gn internet protocol (IP) layer 3 network (e.g., Gn IPL3 network 530) and a data border element (DBE) (e.g., DBE 535).

The authentication message comprising the data element is then routed to, and received by, the 3GHNB gateway (e.g., 3GHNB gateway 540), a network gateway device that is operable to act as a radio network controller (RNC). The 3GHNB gateway can, based on the presence of the data element, facilitate routing of the authentication message (e.g., via a MSC 325, or a SGSN 330) to the home location registry (e.g., HLR 215), where the authentication process as described above, can be performed by the HLR 215 in order to authenticate the 3G fixed cellular device.

In example embodiments in which the 3G fixed cellular device (e.g., 3G alarm panel 305) communicated with the CPIN 500 via a wireless connection, the CPIN 500 can be operable to instruct the 3G fixed cellular device to reduce the power used in its transmissions (e.g., by transmitting an indicator used by the 3G fixed cellular device to determine at what level of power to transmit). Prior to the decommissioning of the 3G NodeB (e.g., 3G NodeB 310) the transmit power of a 3G alarm panel would be higher, due to the fact that the 3G alarm panel would be communicating to a 3G NodeB network node, which is located at a cell site (e.g., longer distance), as opposed to a customer premises like the CPIN 500. Because the 3G NodeB network node could be located further away from the 3G alarm panel, the transmit power used by the 3G alarm panel would have to be higher than that used for transmissions by the 3G alarm panel to a very nearby device, such as the CPIN 500, which located at the customer premises.

In example embodiments in which the 3G fixed cellular device (e.g., 3G alarm panel 305) communicated with the CPIN 500 via a wireless connection, the CPIN 500 can be operable to instruct the 3G fixed cellular device to transmit at a certain frequency, selected by the CPIN 500, so as to reduce interference with other nearby wireless communication devices. The CPIN 500 can base the selection of the frequency on the transmission parameters used by the CPIN 500 to communicate with the LTE network node (e.g., LTE eNodeB 515). For example, if the CPIN 500 communicated with the LTE eNodeB using a frequency X, the CPIN 500 can instruct the 3G fixed cellular communication device to use another frequency other than frequency X. The CPIN 500 can, in example embodiments, instruct the 3G fixed cellular device to transmit at a certain frequency (e.g., frequency Y) that is not frequency X. The 3G fixed cellular device can, in response to the instructions from the CPIN 500, operate on a selected frequency, accordingly.

In example embodiments, the CPIN 500 can also prioritize emergency-related transmissions (e.g., not routine transmissions checking for or reporting the status of the 3G cellular device, which can be periodic transmissions transmitted either to or from the 3G cellular device). For example, if the 3G alarm panel receives a signal from a smoke detector, the 3G alarm panel would transmit an emergency communication (e.g., destined for the monitoring center 120) to facilitate contact of the fire department. So as prioritize emergency related communications, the CPIN 500 can associated that communication with a different class of service (e.g., using an indicator that can be interpreted as prioritizing the emergency communication with a quality of service that is guaranteed).

In example embodiments, the CPIN 500 can also store a copy of the 3G fixed cellular device's IMSI number in a repository associated with the CPIN 500. The CPIN 500 can use the IMSI number to authenticate access by the 3G cellular device to the CPIN 500. This can help prevent unauthorized communication devices from attaching to the CPIN 500. If another device attempts to communicate with the CPIN 500, the CPIN 500 can reject that attempt, based on the other device not having the proper IMSI credentials as the 3G fixed cellular device (e.g., 3G alarm panel).

In each of the example operations described above, and below in FIGS. 6-8, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 6:
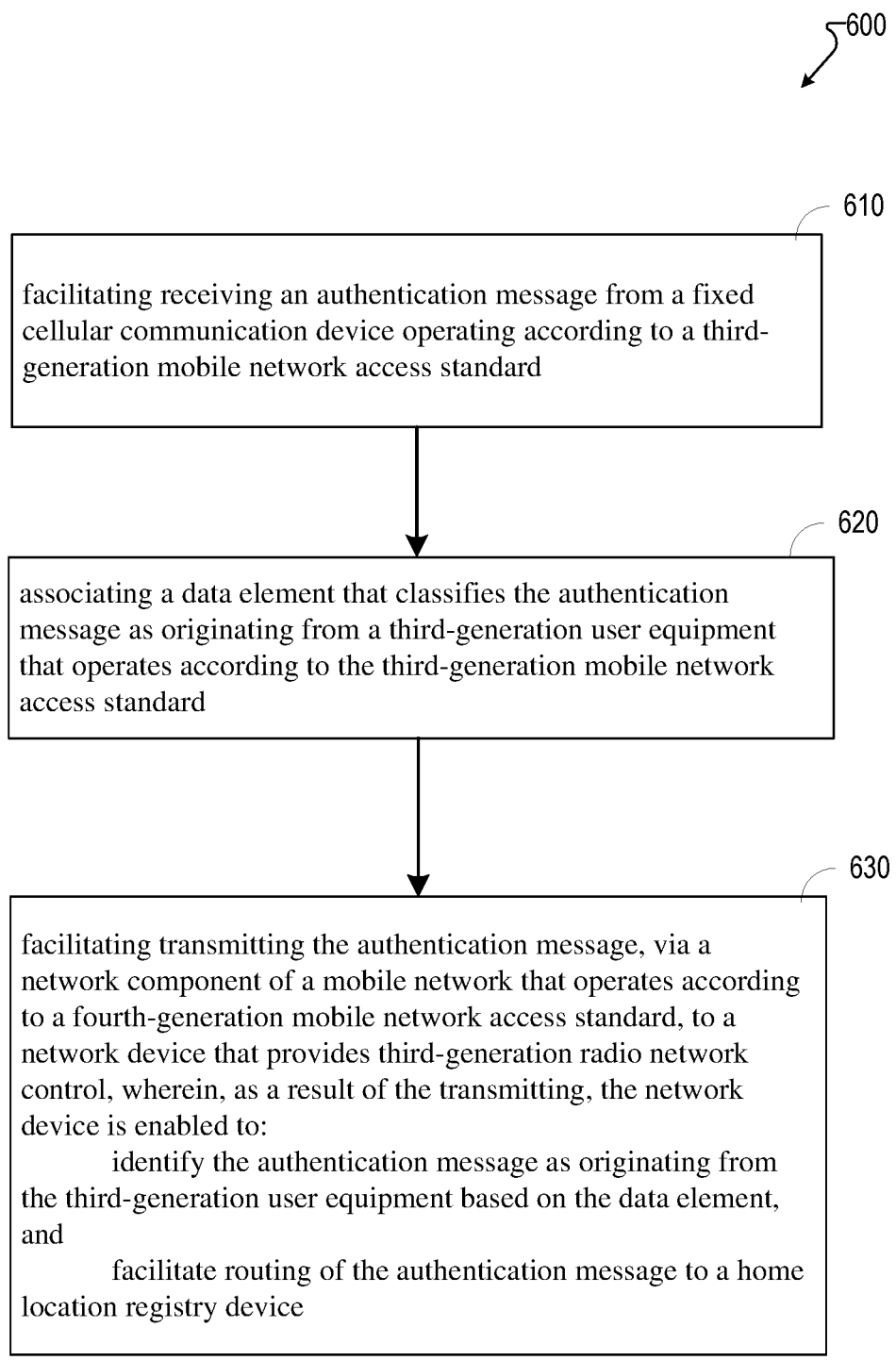
FIG. 6 is an illustration of example operations that can be performed by the CPIN that facilitates authentication of a 3G fixed cellular device for communications via a 4G mobile network, in accordance with various aspects and example embodiments of the subject application.

FIG. 6 depicts example operations 600 that can be performed by a customer premises node device (e.g., CPIN 500) comprising a processor and a memory that stores executable instructions that, when executed by the processor, facilitate performance of example operations 600.

The example operations at block 610 can comprise facilitating receiving an authentication message from a fixed cellular communication device operating according to a third-generation mobile network access standard (e.g., 3G alarm panel 305). The customer premises node device communicates can communicate wirelessly with the fixed cellular communication device in accordance with a femtocell standard (e.g., 3G femtocell). The customer premises node device can, in some example embodiments, receive the authentication message from the fixed cellular communication device via a wired communication link (e.g., co-axial cable, USB, ethernet, etc.).

The example operations at block 620 can comprise associating a data element that classifies the authentication message as originating from a third-generation user equipment that operates according to the third-generation mobile network access standard. The authentication message can comprise an international mobile subscriber identity (IMSI) number associated with the fixed cellular communication device. The associating the data element step can comprise using an access point name (APN) that facilitates communication tunneling of the authentication message to a home location registry device (e.g., HLR 215).

The example operations at block 630 can comprise facilitating transmitting the authentication message, via a network component of a mobile network that operates according to a fourth-generation mobile network access standard (e.g., 4G/LTE mobile network 225), to a network device that provides third-generation radio network control (e.g., 3GHNB gateway 540). The network component can be, for example, LTE eNodeB 515, LTE SGW 520, LTE PGW 525, Gn IPL3 network 530, data border element 535, etc. As a result of the transmitting, the network device is enabled to identify the authentication message as originating from the third-generation user equipment based on the data element, and can facilitate routing of the authentication message to the home location registry device. The authentication message can be routed through, for example, MSC 325 and SGSN 330.

The example operations 600 can further comprise facilitating transmitting an instruction that facilitates a reduction in power of a signal that was transmitted by the fixed cellular communication device.

The example operations 600 can further comprise facilitating transmitting an instruction that that facilitates selection by the fixed cellular communication device of a transmission frequency that reduces a probability of interference from other transmissions that have been originated by other communication devices.

The example operations 600 can further comprise using, by the customer premises node device, a stored international mobile subscriber identity (IMSI) number associated with the fixed cellular communication device to determine whether to allow a connection of the fixed cellular communication device to the customer premises node device.

Figure 7:
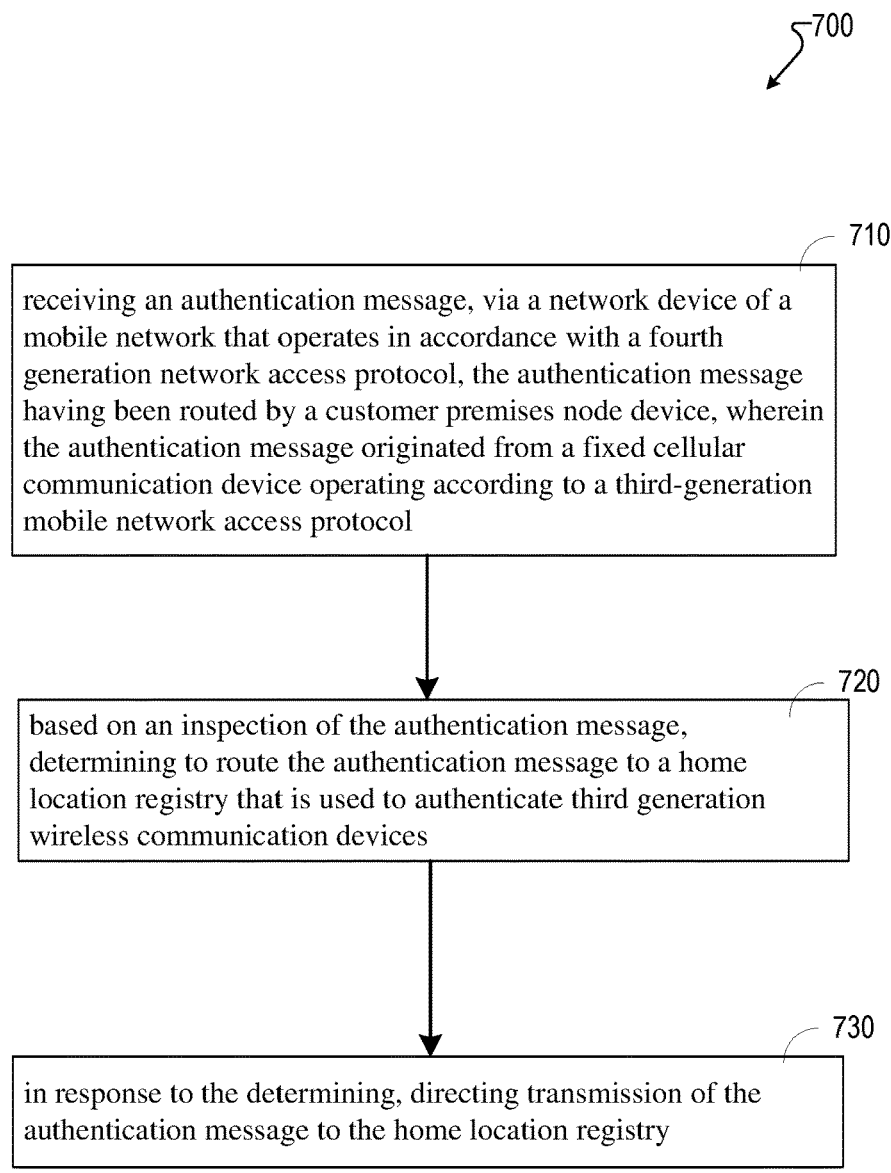
FIG. 7 is an illustration of example operations that can be performed by a 3G home NodeB gateway (3GHNB gateway), a network device that facilitates authentication of a 3G fixed cellular device for communications via a 4G mobile network, in accordance with various aspects and example embodiments of the subject application.

FIG. 7 depicts example operations 700 that can be performed by a network gateway device (e.g., 3GHNB gateway 540) comprising a processor and a memory that stores executable instructions that, when executed by the processor, facilitate performance of example operations 700. As mentioned above, the network gateway device can perform radio network control functions.

The example operations 700 can comprise, at 710, receiving an authentication message, via a network device of a mobile network that operates in accordance with a fourth generation network access protocol (e.g., 4G/LTE mobile network 225). The network device can be, for example, LTE eNodeB 515, LTE SGW 520, LTE PGW 525, Gn IPL3 network 530, data border element 535, etc. The authentication message can have been routed by a customer premises node device (CPIN 500), wherein the authentication message originated from a fixed cellular communication device operating according to a third-generation mobile network access protocol (e.g., 3G alarm panel 305). The authentication message can be routed by the customer premises node device using an access point name (APN).

At 720, the example operations 700 can comprise, based on an inspection of the authentication message, determining to route the authentication message to a home location registry (HLR 215) that is used to authenticate third generation wireless communication devices (e.g., 3G user equipment (UE)).

At 730, the operations can comprise, in response to the determining, directing transmission of the authentication message to the home location registry. The directing the transmission of the authentication message to the home location registry can further comprise directing the authentication message to the home location registry via a networked device enabled with a mobile switching center functionality (e.g., MSC 325). vice of claim 10, wherein the directing the transmission of the authentication message to the home location registry further comprises directing the authentication message to the home location registry via a networked device enabled with a support node functionality (e.g., SGSN 330).

Figure 8:
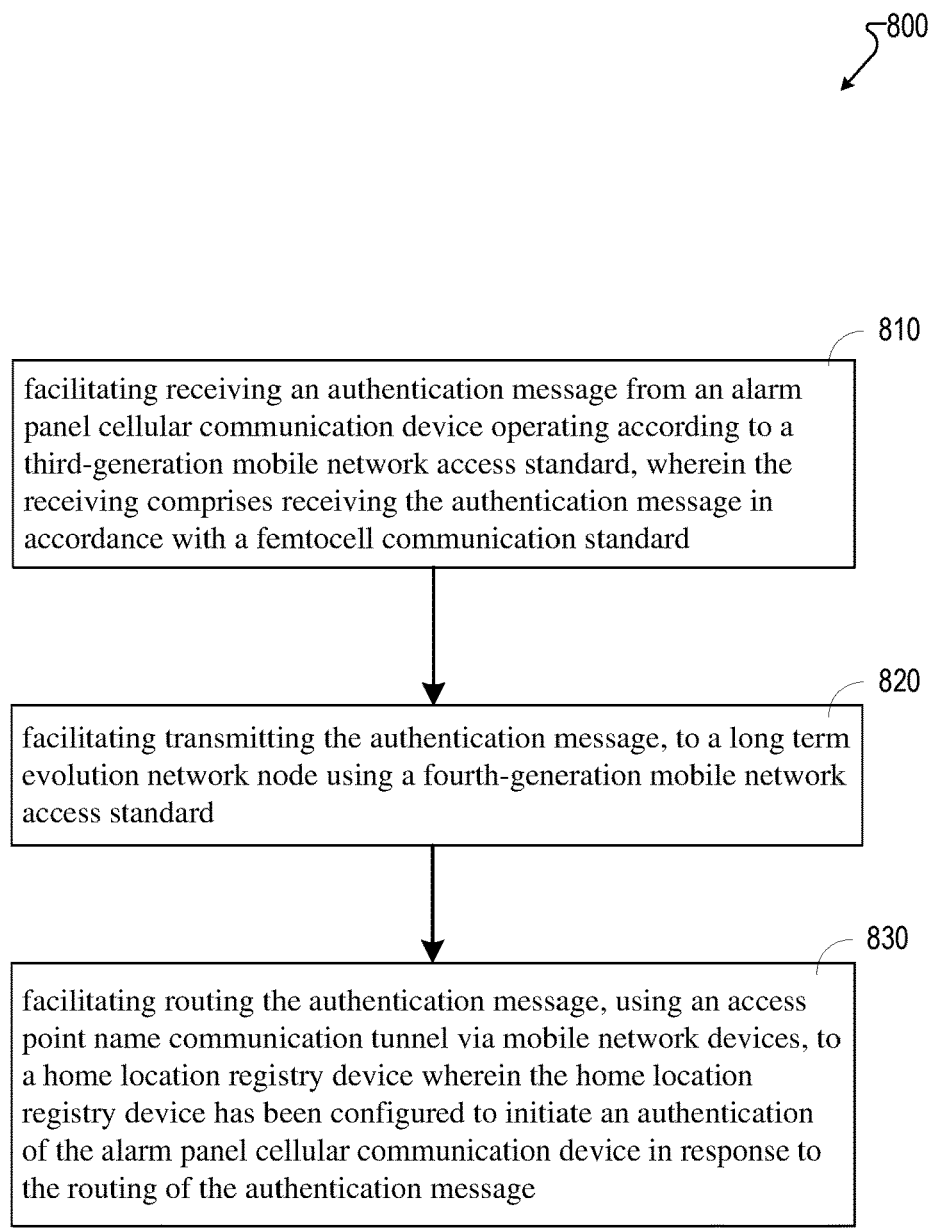
FIG. 8 is an illustration of another example of operations that can be performed by the CPIN to facilitate authentication of a 3G fixed cellular device for communications via a 4G mobile network, in accordance with various aspects and example embodiments of the subject application.

FIG. 8 depicts example operations 800 that can be performed by a customer premises node device (e.g., CPIN 500) comprising a processor and a memory that stores executable instructions that, when executed by the processor, facilitate performance of example operations 600.

The example operations 800 can comprise, at 810, facilitating receiving an authentication message from an alarm panel cellular communication device operating according to a third-generation mobile network access standard (e.g., 3G alarm panel 305), wherein the receiving comprises receiving the authentication message in accordance with a femtocell communication standard (e.g., 3G femtocell). The authentication message can comprise an international mobile subscriber identity number associated with the alarm panel cellular communication device.

The example operations 800 can comprise, at 820, facilitating transmitting the authentication message, to a long term evolution network node (e.g., LTE eNodeB 515) using a fourth-generation mobile network access standard (e.g., 4G/LTE).

The example operations 800 can comprise, at 830, facilitating routing the authentication message, using an access point name communication tunnel via mobile network devices, to a home location registry device (HLR 215) wherein the home location registry device has been configured to initiate an authentication of the alarm panel cellular communication device in response to the routing of the authentication message.

The example operations 800 can further comprise facilitating transmitting an instruction that facilitates a reduction in power of a signal transmitted by the alarm panel cellular communication device.

The example operations 800 can further comprise, facilitating transmitting an instruction that facilitates selection by the alarm panel cellular communication device of a transmission frequency that reduces a probability of interference from transmissions by other communication devices.

The example operations 800 can further comprise, prioritizing emergency-related transmissions received from the alarm panel cellular communication device by associating respective classes of service with the emergency-related transmissions.

Figure 9:
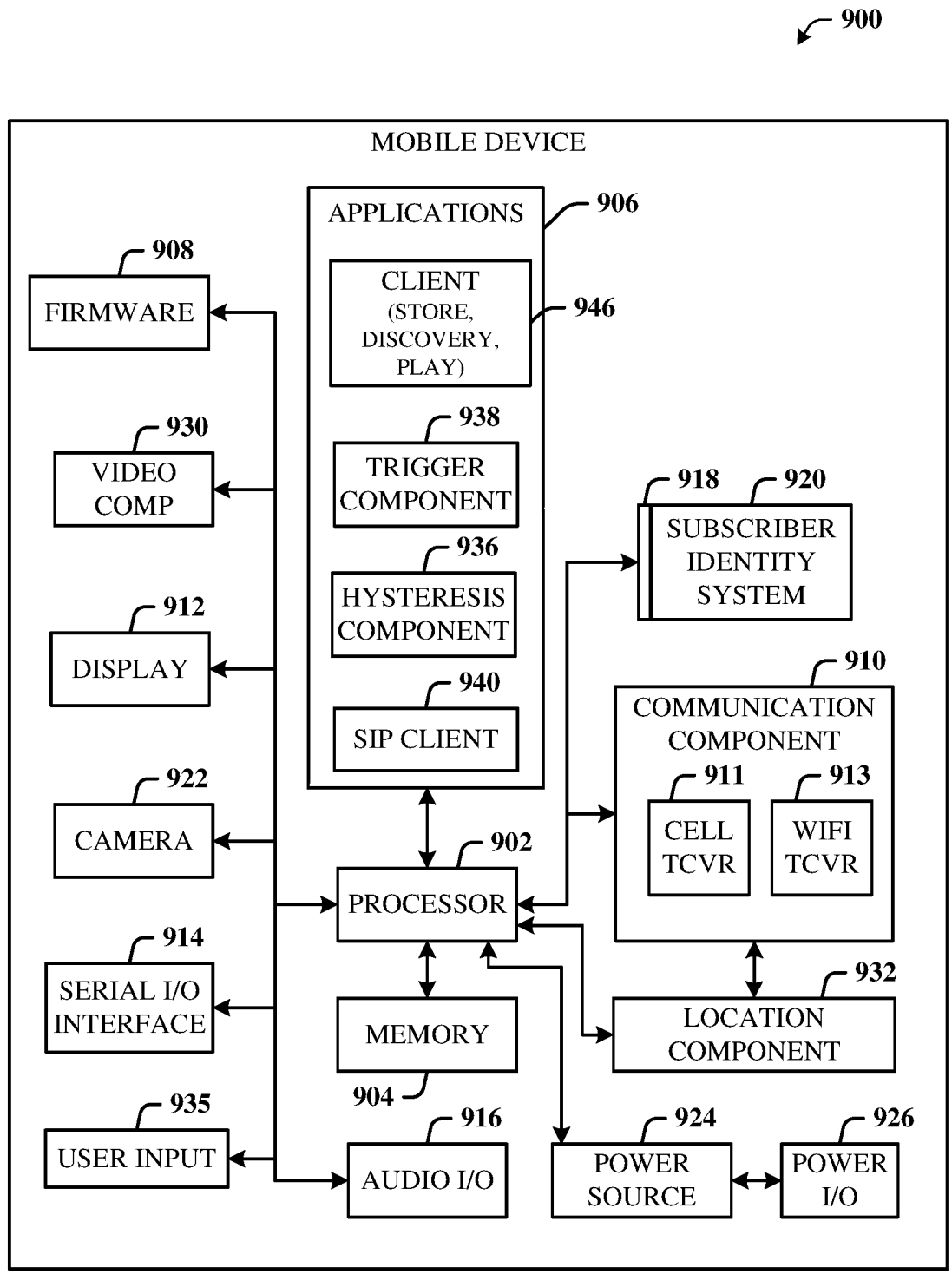
FIG. 9 illustrates an example block diagram of a mobile device that can be operable to communicate with a mobile network, in accordance with various aspects and embodiments of the subject application.

Referring now to FIG. 9, illustrated is a schematic block diagram showing some example components of a 3G fixed cellular device (e.g., 3G alarm panel 305, CPIN 500 comprising LTE interface component 510) that can be a mobile device capable of connecting to a network in accordance with some embodiments described herein. One or more of the components as illustrated in FIG. 9 can comprise the user equipment, and although a mobile device 900 is illustrated herein, it will be understood that other devices can be a mobile device, and that the mobile device 900 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The mobile device 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the mobile device 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMAX) for corresponding signal communications. The mobile device 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile device 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The mobile device 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the mobile device 900, and updated by downloading data and software.

The mobile device 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the mobile device 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The mobile device 900 also comprises a power source 924 in the form of batteries and/or an AC power subsystem, which power source 924 can interface to an external power system or charging equipment (not shown) by a power I/O component 926.

The mobile device 900 can also include a video component 930 for processing video content received and, for recording and transmitting video content. For example, the video component 930 can facilitate the generation, editing and sharing of video quotes. A location tracking component 932 facilitates geographically locating the mobile device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the mobile device 900 to support SIP protocols and register the subscriber with the SIP registrar server. The applications 906 can also include a client 942 that provides at least the capability of discovery, play and store of multimedia content, for example, music.

The mobile device 900, as indicated above related to the communications component 910, comprises an indoor network radio transceiver 913 (e.g., Wi-Fi transceiver). This function supports the indoor radio link, such as IEEE 802.11, for a dual-mode GSM handset. The mobile device 900 can accommodate at least satellite radio services through a mobile device that can combine wireless voice and digital radio chipsets into a single handheld device.

Figure 10:
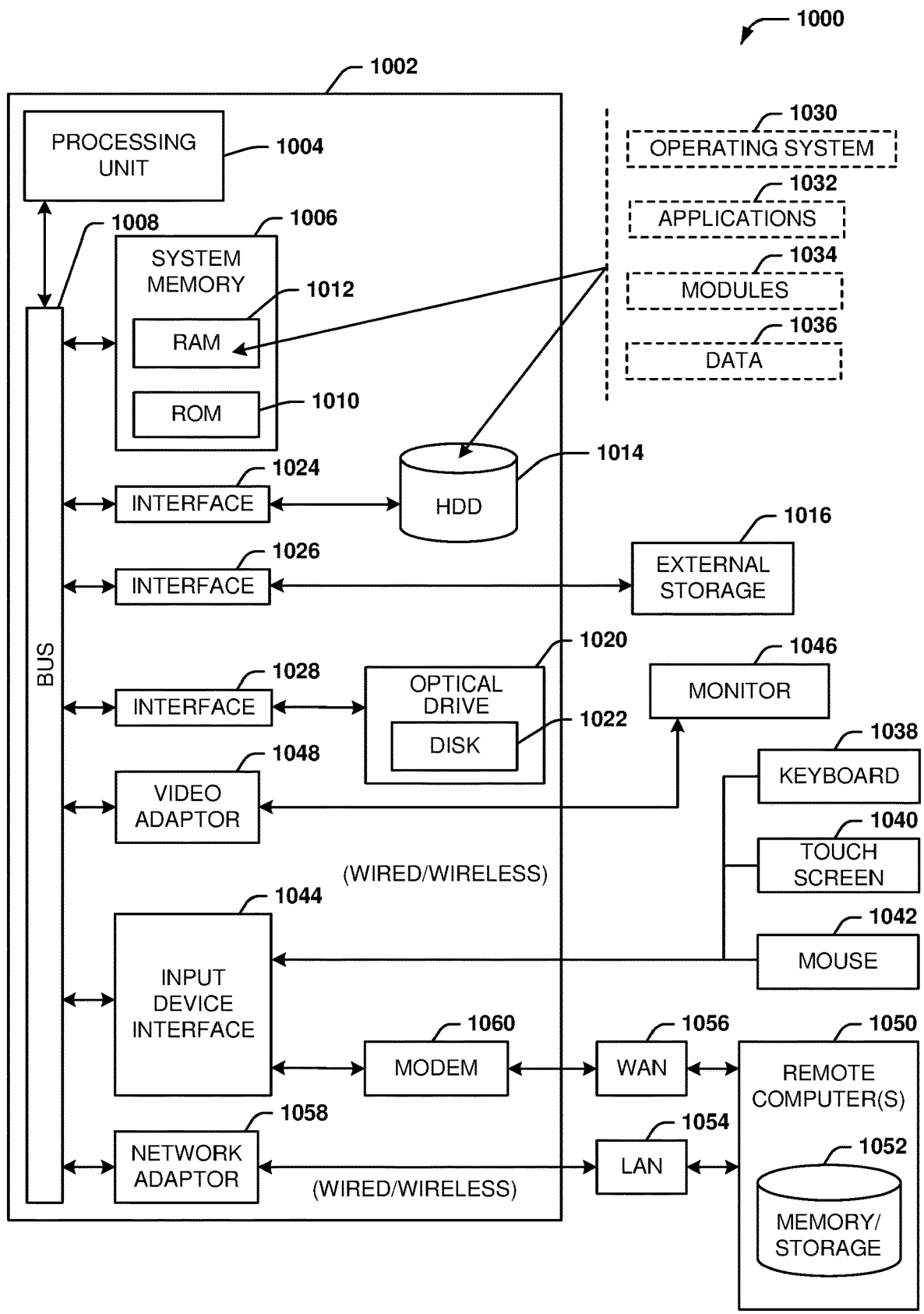
FIG. 10 illustrates an example block diagram of a computer that can be operable to execute processes and methods, in accordance with various aspects and embodiments of the subject application.

In order to provide additional context for various embodiments described herein, FIG. 10 and the following discussion are intended to provide a brief, general description of a suitable computing environment 1000 in which the various embodiments described herein can be implemented. For example, one or more of the network devices shown in FIG. 5 (e.g., CPIN 500, 3GHNB gateway 540) can have similar components to that of the computer described in FIG. 10.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

The term "facilitate" as used herein is in the context of a system, device or component "facilitating" one or more actions, methods, or example operations, in respect of the nature of complex computing environments in which multiple components and/or multiple devices can be involved in some computing operations. Non-limiting examples of actions that may or may not involve multiple components and/or multiple devices comprise the methods described herein, including but not limited to transmitting or receiving data, establishing a connection between devices, determining intermediate results toward obtaining a result, etc. In this regard, a computing device or component can facilitate an operation by playing any part in accomplishing the operation (e.g., directing, controlling, enabling, etc.). When operations of a component are described herein, it is thus to be understood that where the operations are described as facilitated by the component, the operations can be optionally completed with the cooperation of one or more other computing devices or components, such as, but not limited to, processors, application specific integrated circuits (ASICs), sensors, antennae, audio and/or visual output devices, other devices, etc.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A method, comprising:
receiving, by a third-generation mobile network access transceiver of a customer premises intermediate node device comprising a processor, an authentication message in a first format from a fixed cellular communication device operating according to a third-generation mobile network access standard;
converting, by the customer premises intermediate node device, the authentication message in the first format into a converted authentication message in a second format according to a fourth-generation mobile network access standard, wherein the converting comprises adding a data element to the converted authentication message that classifies the converted authentication message as originating from a third-generation user equipment that operates according to the third-generation mobile network access standard; and
transmitting, by a fourth-generation mobile network access transceiver of the customer premises intermediate node device, the converted authentication message to network equipment that operates according to a fourth-generation mobile network access standard and facilitates providing third-generation radio network control, wherein, as a result of the transmitting, the network equipment is enabled to:
identify the converted authentication message as originating from the third-generation user equipment based on the data element, and
facilitate routing of the converted authentication message to a home location registry device for authentication of the fixed cellular communication device to communicate via the fourth-generation mobile network access transceiver of the customer premises intermediate node device.

2. The method of claim 1, wherein the fixed cellular communication device comprises an alarm panel.

3. The method of claim 1, wherein the authentication message comprises an international mobile subscriber identity number associated with the fixed cellular communication device.

4. The method of claim 1, wherein adding the data element comprises using an access point name that facilitates communication tunneling of the converted authentication message to the home location registry device.

5. The method of claim 1, wherein the third-generation mobile network access transceiver employs a third-generation mobile network access femtocell standard.

6. The method of claim 1, wherein the converting further comprises, in response to determining that the authentication message is associated with an alarm condition, adding a priority indicator to the converted authentication message.

7. The method of claim 1, further comprising transmitting, by the third-generation mobile network access transceiver of the customer premises intermediate node device, an instruction that facilitates a reduction in power of a signal that was transmitted by the fixed cellular communication device.

8. The method of claim 1, further comprising transmitting, by the third-generation mobile network access transceiver of the customer premises intermediate node device, an instruction that facilitates selection by the fixed cellular communication device of a transmission frequency that reduces a probability of interference from other transmissions that have been originated by other communication devices.

9. The method of claim 1, further comprising using, by the customer premises intermediate node device, a stored international mobile subscriber identity number associated with the fixed cellular communication device to determine whether to allow a connection of the fixed cellular communication device to the customer premises intermediate node device.

10. A non-transitory machine-readable medium, comprising executable instructions that, when executed by a customer premises intermediate node device comprising a processor, facilitate performance of operations, comprising:
receiving, by a third-generation mobile network access transceiver of the customer premises node device, an authentication message in a first format from an alarm panel cellular communication device operating according to a third-generation mobile network access standard;
changing the authentication message in the first format into a converted authentication message in a second format according to a fourth-generation mobile network access standard, wherein the changing comprises adding a data element to the converted authentication message that classifies the converted authentication message as originating from a third-generation device that operates according to the third-generation mobile network access standard;
transmitting, by a fourth-generation mobile network access transceiver of the customer premises node device, the converted authentication message to a long term evolution network node using the fourth-generation mobile network access standard, wherein the long term evolution network node facilitates routing the converted authentication message based on the data element, using an access point name communication tunnel via mobile network devices, to a home location registry device, and wherein the home location registry device has been configured to initiate an authentication of the alarm panel cellular communication device to communicate via the fourth-generation mobile network access transceiver of the customer premises intermediate node device, in response to the routing of the converted authentication message.

11. The non-transitory machine-readable medium of claim 10, wherein the authentication message comprises an international mobile subscriber identity number associated with the alarm panel cellular communication device.

12. The non-transitory machine-readable medium of claim 10, wherein the operations further comprise, transmitting an instruction that facilitates a reduction in power of a signal transmitted by the alarm panel cellular communication device.

13. The non-transitory machine-readable medium of claim 10, wherein the operations further comprise, transmitting an instruction that facilitates selection by the alarm panel cellular communication device of a transmission frequency that reduces a probability of interference from transmissions by other communication devices.

14. The non-transitory machine-readable medium of claim 10, wherein the operations further comprise, prioritizing emergency-related transmissions received from the alarm panel cellular communication device by associating respective classes of service with the emergency-related transmissions.

15. A customer premises intermediate node device, comprising:
- a processor; and
- a memory that stores executable instructions that, when executed by the processor, facilitate performance of operations, comprising:
  - receiving, by a third-generation mobile network access transceiver of the customer premises intermediate node device, an authentication message in a first format from a fixed third-generation cellular communication device operating according to a third-generation mobile network access standard;
  - transforming the authentication message in the first format into a converted authentication message in a second format according to a fourth-generation mobile network access standard, wherein the transforming comprises adding a data element to the converted authentication message that classifies the converted authentication message as originating from a third-generation user equipment that operates according to the third-generation mobile network access standard; and
  - transmitting, by a fourth-generation mobile network access transceiver of the customer premises intermediate node device, the converted authentication message to network equipment that operates according to a fourth-generation mobile network access standard and facilitates routing, based on the data element, the converted authentication message to a home location registry device for authentication of the fixed cellular communication device to communicate via the fourth-generation mobile network access transceiver of the customer premises intermediate node device.

16. The customer premises intermediate node device of claim 15, wherein the fixed third-generation cellular communication device comprises an alarm panel.

17. The customer premises intermediate node device of claim 15, wherein the authentication message comprises an international mobile subscriber identity number associated with the fixed third-generation cellular communication device.

18. The customer premises intermediate node device of claim 15, wherein adding the data element comprises using an access point name that facilitates communication tunneling of the converted authentication message to the home location registry device.

19. The customer premises intermediate node device of claim 15, wherein the third-generation mobile network access transceiver employs a third-generation mobile network access femtocell standard.

20. The customer premises intermediate node device of claim 15, wherein the transforming further comprises, in response to determining that the authentication message is associated with an emergency condition, adding a priority indicator to the converted authentication message.

* * * * *